US010677591B2

(12) United States Patent
Huang (10) Patent No.: US 10,677,591 B2
(45) Date of Patent: Jun. 9, 2020

(54) SYSTEM AND METHOD FOR MEASURING THREE-DIMENSIONAL SURFACE FEATURES

(71) Applicant: Texas Department of Transportation, Austin, TX (US)

(72) Inventor: Yaxiong Huang, Austin, TX (US)

(73) Assignee: Texas Department of Transportation, Austin, TX (US)

( * ) Notice: Subject to any disclaimer, the term of this patent is extended or adjusted under 35 U.S.C. 154(b) by 0 days.

(21) Appl. No.: 15/957,374

(22) Filed: Apr. 19, 2018

(65) Prior Publication Data

US 2018/0313647 A1 Nov. 1, 2018

Related U.S. Application Data

(63) Continuation of application No. 13/874,968, filed on May 1, 2013, now Pat. No. 10,036,631.

(60) Provisional application No. 61/687,816, filed on May 1, 2012.

(51) Int. Cl.
*G01B 11/30* (2006.01)
*G01B 11/25* (2006.01)

(52) U.S. Cl.
CPC ........ *G01B 11/303* (2013.01); *G01B 11/2527* (2013.01); *G01B 11/2545* (2013.01)

(58) Field of Classification Search
CPC .............. G01B 11/303; G01B 11/2527; G01B 11/2545
See application file for complete search history.

(56) References Cited

U.S. PATENT DOCUMENTS

| 4,899,296 A | 2/1990 | Khattak |
|---|---|---|
| 4,958,306 A | 9/1990 | Powell et al. |
| 5,323,647 A | 6/1994 | Blanco |
| 6,542,249 B1 | 4/2003 | Kofman |
| 7,562,563 B2 | 7/2009 | Wee |
| 7,697,727 B2 | 4/2010 | Xu et al. |
| 8,929,642 B2 | 1/2015 | Ichimaru |

(Continued)

OTHER PUBLICATIONS

Non Final Office Action for U.S. Appl. No. 13/874,968 dated May 18, 2017.

(Continued)

*Primary Examiner* — Hina F Ayub
(74) *Attorney, Agent, or Firm* — Kowert, Hood, Munyon, Rankin & Goetzel, P.C.; Mark R. DeLuca (57) ABSTRACT

In some embodiments, a system for measuring surface features may include a pattern projector, at least one digital imaging device, and an image processing device. The pattern projector may project, during use, a pattern of light on a surface of an object. In some embodiments, the pattern projector moves, during use, the pattern of light along the surface of the object. In some embodiments, the pattern projector moves the pattern of light in response to electronic control signals. At least one of the digital imaging devices may record, during use, at least one image of the projected pattern of light. The image processing device which, during use, converts projected patterns of light recorded on at least one of the images to three-dimensional data points representing a surface geometry of the object using relative positions and relative angles between the at least one imaging device and the pattern projector.

20 Claims, 9 Drawing Sheets

(56) References Cited

U.S. PATENT DOCUMENTS

| | | |
|---|---|---|
| 2003/0137673 A1 | 7/2003 | Cox |
| 2008/0165357 A1* | 7/2008 | Stern ................. G01B 11/0608 356/364 |
| 2008/0165358 A1 | 7/2008 | Engelhardt |
| 2008/0184785 A1 | 8/2008 | Wee |
| 2009/0046301 A1* | 2/2009 | Asakura ................. G01B 11/24 356/610 |
| 2009/0145214 A1 | 6/2009 | Muhlhoff |
| 2009/0163796 A1 | 6/2009 | Simpson |
| 2010/0329538 A1 | 12/2010 | Remillard |
| 2013/0293684 A1 | 11/2013 | Becker |
| 2013/0321582 A1 | 12/2013 | Huang |

OTHER PUBLICATIONS

Final Office Action for U.S. Appl. No. 13/874,968 dated Sep. 6, 2017.
Non Final Office Action for U.S. Appl. No. 13/874,968 dated Nov. 20, 2017.
Notice of Allowance for U.S. Appl. No. 13/874,968 dated Apr. 11, 2018.

* cited by examiner

SYSTEM AND METHOD FOR MEASURING THREE-DIMENSIONAL SURFACE FEATURES

PRIORITY CLAIM

This application is a continuation of U.S. patent application Ser. No. 13/874,968 entitled "System and Method for Measuring Three-dimensional Surface Features" filed on May 1, 2013, which claims priority to U.S. Provisional Patent Application No. 61/687,816 entitled "Three-dimensional Surface Features Measurement with Digital Camera and Projector" filed on May 1, 2012, all of which are incorporated by reference herein.

BACKGROUND OF THE INVENTION

1. Field of the Invention

The present disclosure generally relates to systems and methods for three-dimensional surface feature measurements. More particularly, the disclosure generally relates to portable pavement surface measurement device.

2. Description of the Relevant Art

The three-dimensional (3D) surface measurement devices or scanners are widely used to measure three-dimensional structures of an object or a surface. The 3D surface structures are used to measure surface features, build 3D models, or create a mechanical drawing used for reverse engineering. Different techniques exist for the design and implementation of such 3D scanners. One method uses a point or line distance sensor and a mechanical stage. Usually, the stage moves the sensor in one or two directions on a surface area. The sensor measures the distance between a reference surface and the object surface. As the sensor is moved at a fixed elevation, changes of measured distances are used to generate an image or map of the scanned surface. This mechanical scanning technology requires a very precise conveyance mechanism to achieve acceptable precision and accuracy. Thus this technology is often considered as cost-ineffective as well as inefficient due to the speed at which data is gathered.

Most current 3D scanning devices use a non-contact optical sensor (e.g., laser triangulation sensor). Laser triangulation is a concept in which the positions of a reflected laser light from a surface are captured in a photo detector as a function of the distance between the surface and the photo detector. The sensor typically is either a point type having a point laser source and a linear array of photo detector measuring a single point from a surface, or a line type having a laser line projector and an area array (e.g., a camera), and measures a line from a surface. The laser light may appear in multiple units (pixels) of the photo detector. Different processes are used to determine the center of the laser light to represent measured distance. For example, the center of gravity method detects laser light position in sub-pixel resolution. The measured laser light position could be one fourth, one sixteenth, or even one sixty-fourth of the photo detector pixel size.

Other current methods of 3D measurement include the stereo-vision or stereo-match technology. Two identical imaging devices (e.g., cameras) are positioned in well defined locations. The imaging devices obtain images of the target object from different positions at different angles. A particular feature on a target object will appear at different pixel positions in images from the two devices. The geometric location of the surface feature can be calculated using the two pixel positions and other parameters such as device location and directions. For a complete measurement, all pixels in images from the two image devices that correspond to the same features need to be identified. However, it is often difficult to obtain perfect pixel level feature matching, especially in surfaces with low color contrast, or surfaces that lack identifying physical features. In the more problematic cases, a pattern projector may be used to create artificial color patterns on the surface. These color patterns, when captured by both imaging devices, can be used to improve the speed and accuracy of the pixel matching processes. Compared to the laser triangulation method, stereo-matching method is faster. However, the laser triangulation method's resolution is lower and its data noise is higher due to the difficulty of pixel matching.

Therefore a system and/or method which provides a better automated test for a more accurate measurement of pavement texture and other features would be highly desirable.

SUMMARY

This disclosure describes systems and methods related to, in some embodiments, measuring surface features. In some embodiments, the system may include a pattern projector, at least one digital imaging device, and an image processing device. The pattern projector may project, during use, a pattern of light on a surface of an object. In some embodiments, the pattern projector moves, during use, the pattern of light along the surface of the object. In some embodiments, the pattern projector moves the pattern of light in response to electronic control signals. At least one of the digital imaging devices may record, during use, at least one image of the projected pattern of light. The image processing device which, during use, converts projected patterns of light recorded on at least one of the images to three-dimensional data points representing a surface geometry of the object using relative positions and relative angles between the at least one imaging device and the pattern projector.

BRIEF DESCRIPTION OF THE DRAWINGS

Advantages of the present invention may become apparent to those skilled in the art with the benefit of the following detailed description of the preferred embodiments and upon reference to the accompanying drawings.

FIG. 9b depicts a diagram of an embodiment of a zoomed in view of a single aggregate particle in FIG. 9a.

FIG. 10b depicts a diagram of an embodiment of a measured surface profile of the concrete joint in FIG. 10a.

FIG. 11b depicts a diagram of an embodiment of a profile of the measured data in FIG. 11a.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

\* \* \*

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third die electrically connected to the module substrate" does not preclude scenarios in which a "fourth die electrically connected to the module substrate" is connected prior to the third die, unless otherwise specified. Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

It is to be understood the present invention is not limited to particular devices, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Thus, for example, reference to "a linker" includes one or more linkers.

DETAILED DESCRIPTION

Definitions

Unless defined otherwise, all technical and scientific terms used herein have the same meaning as commonly understood by one of ordinary skill in the art.

The term "connected" as used herein generally refers to pieces which may be joined or linked together.

The term "coupled" as used herein generally refers to pieces which may be used operatively with each other, or joined or linked together, with or without one or more intervening members.

The term "directly" as used herein generally refers to one structure in physical contact with another structure, or, when used in reference to a procedure, means that one process effects another process or structure without the involvement of an intermediate step or component.

Figure 1:
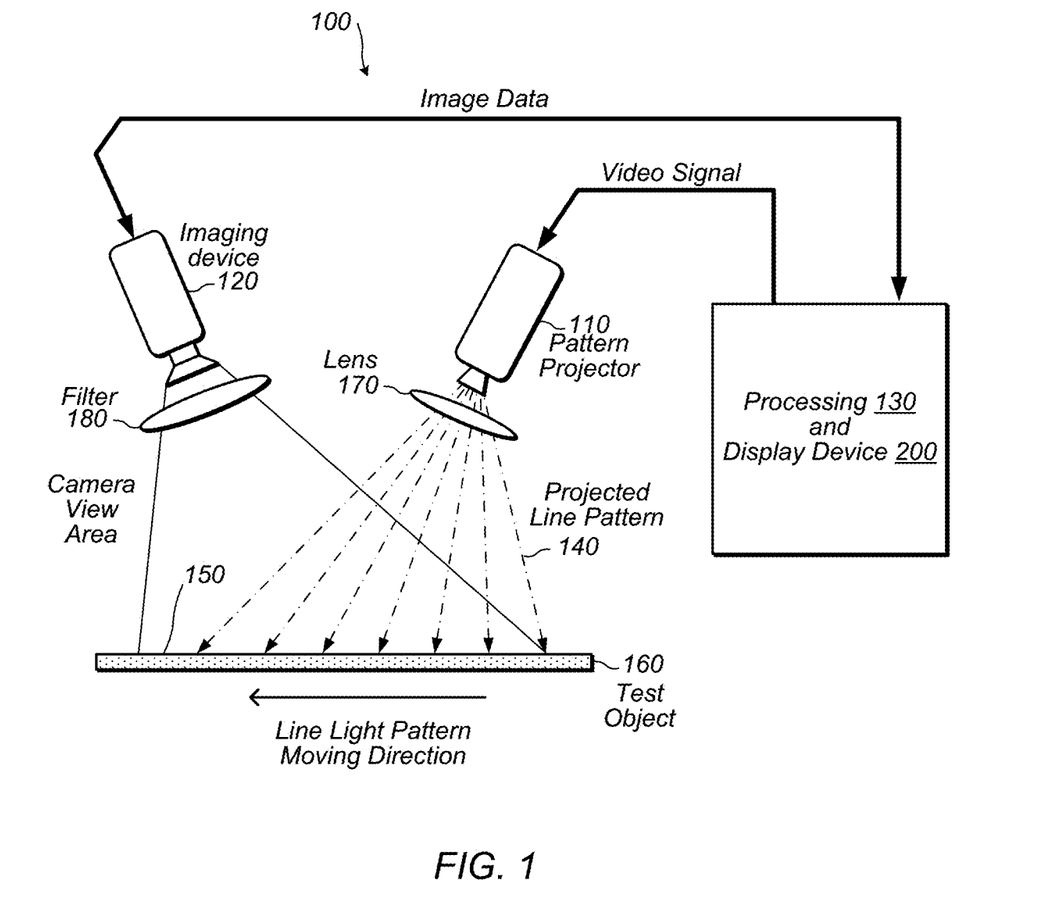
FIG. 1 depicts a diagram of a perspective view of an embodiment of a single pattern projector and a single digital imaging device system.

In some embodiments, system 100 for measuring surface features may include pattern projector 110, at least one digital imaging device 120, and image processing device 130. The pattern projector may project, during use, pattern of light 140 on surface 150 of object 160. At least one of the digital imaging devices may record, during use, at least one image of the projected pattern of light. In some embodiments, at least one of the digital imaging devices may include one or more digital cameras. The image processing device which, during use, converts projected patterns of light recorded on at least one of the images to three-dimensional data points representing a surface geometry of the object using relative positions and relative angles between the at least one imaging device and the pattern projector.

Figure 2:
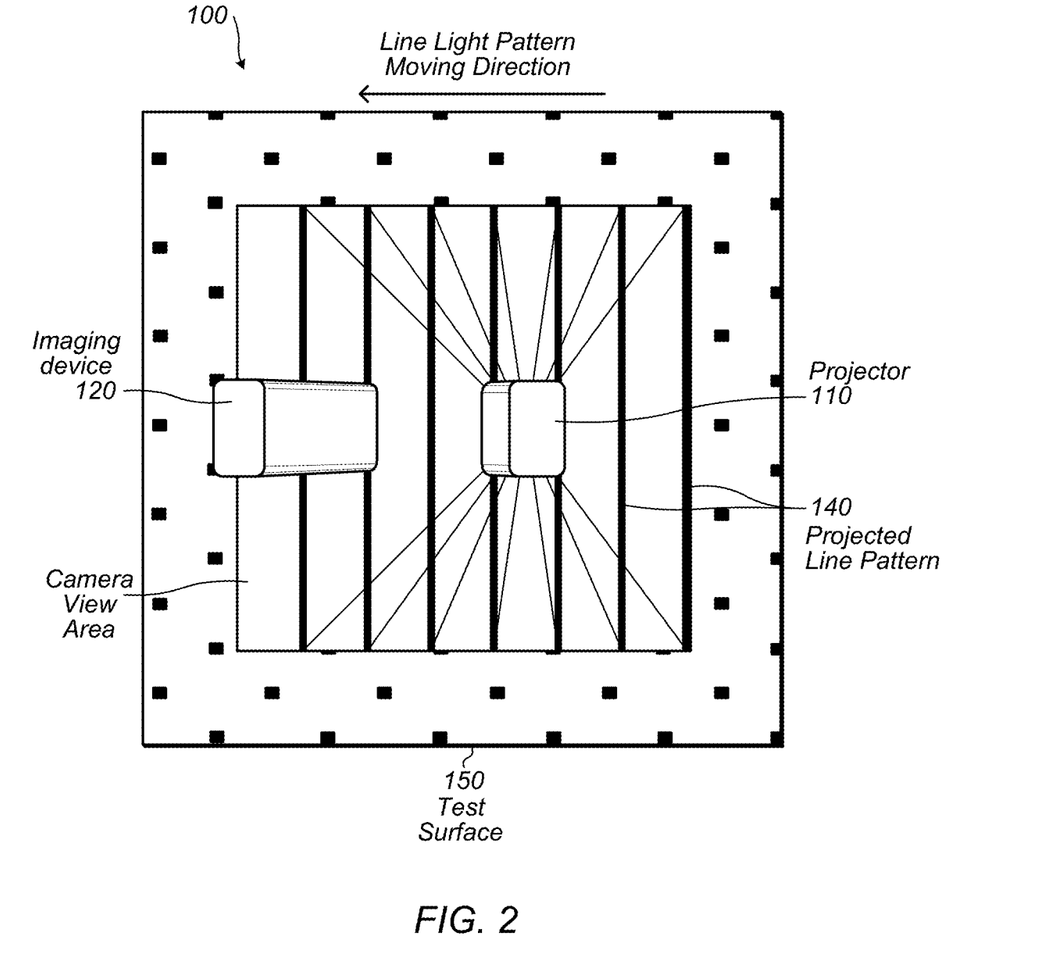
FIG. 2 depicts a diagram of a top view of an embodiment of the system depicted in FIG. 1.

FIG. 1 depicts a diagram of a perspective view of an embodiment of single pattern projector 110 and single digital imaging device 120 for system 100 for measuring 3D surface features. The pattern projector may project a multiple line pattern on the surface. The pattern projector may move the pattern over the surface (e.g., in individual increments or steps). The imaging device may record images of the pattern projected on the surface of the object. FIG. 2 depicts a diagram of a top view of the embodiment of system 100 depicted in FIG. 1 without the image processing device and the display device depicted. For example, in some embodiments, the imaging device may include a high definition webcam connected to the image processing device and display device via a USB port. In some embodiments, the pattern projector projects the pattern of light using at least one of a laser light source or an LED light source. While in some embodiments the pattern projector may include a mini LED video projector. In some embodiments, the system may include display device 200 which displays the three-dimensional data points. The derived data may be displayed in a variety of formats on the display device. The data may be, for example, displayed graphically or numerically. In some embodiments, processing device and display device may be combined in a single unit such as a laptop computer. In some embodiments, the projector may be coupled to the processing and display device as the secondary display device (e.g., via a VGA port). Any display contents including various line patterns sent to the projector by the computer may be projected on the surface.

In some embodiments, the pattern projector moves, during use, the pattern of light along the surface of the object, wherein the pattern projector moves the pattern of light in response to electronic control signals. The system described herein for 3D surface feature measurement. The method and apparatus uses an electronically controlled light pattern projector to project and move the light pattern across the entire test surface. In some embodiments, there is no mechanical motion required in the scanning process. The apparatus may be advantageous in that it is fast, portable and more energy efficient.

In some embodiments, at least one of the digital imaging devices includes one or more additional optical lens for focus adjustment. Typically commercially available projectors currently available have a minimum focal distance. If the projection distance from the projector to the surface of the object is shorter than this minimum focal distance, the projected light pattern may be out of focus. Lens 170 (e.g., depicted in FIG. 1) may be used to reset the minimum focal distance. The type and parameters of the lens may be selected according to the specifications of the pattern projector and the projection distance.

In some embodiments, at least one of the digital imaging devices may include one or more filters. At least one of the filters may function to polarize the light. Light reflected from a smooth or reflective surface may result in artifacts occurring from glares in a digital imaging device's images. Glares distort the line light pattern and cause significant noises in images recorded by a digital imaging device. Artifacts in a digital image may result in errors occurring during processing of the image. As such a system may include filter 180 (e.g., depicted in FIG. 4). Filter 180 may include a polarizer filter used to reduce glare effect when necessary.

In some embodiments, when a measurement process begins, the processing device may create an empty data buffer with W points wide and H points high. H may be equal to or smaller than the vertical resolution or pixel number of the projector. W may be the pixel number of a light line appearing in images. The processing device may then send the first N-line pattern to the pattern projector, which then projects on the test surface at a predetermined first position (e.g., the rightmost position). N may include the number of lines projected concurrently by the pattern projector. At this first position, an image index may be set to zero. The processing device may record an image through the imaging device. The processing device may process the recorded image to find pixel positions of each line in the image.

Figure 3:
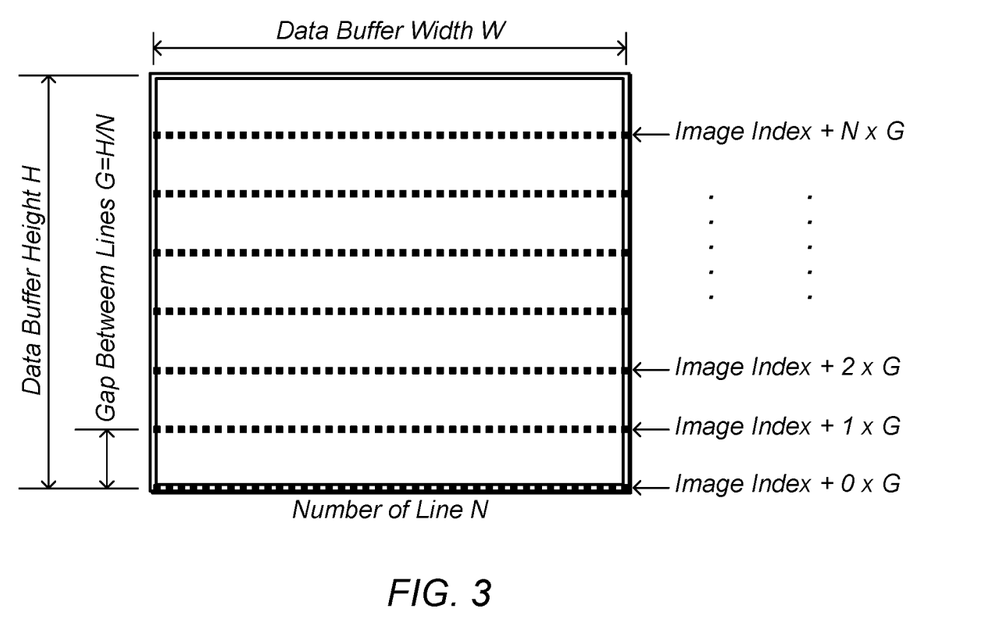
FIG. 3 depicts a diagram of a top view of an embodiment of a structure of a measured data buffer.

The N lines of pixel position data may be converted to the surface heights using a calibration lookup table by the processing device. These surface height data fill N rows in the data buffer in an arrangement (e.g., as depicted in FIG. 3). G may include the gap in pixels between two lines. After completing processing of the first recorded image, the processing device shifts every line in the line pattern, for example, one pixel up, and conveys the new N-line pattern to the pattern projector, and increases the image index by one. The process may then be repeated till the image index is equal to G. Because the image index is increased with a newly captured image, the data buffer is filled at different rows corresponding to the image index. The entire data buffer is filled when image index reaches G. In some embodiments, the image processing device uses a center of gravity algorithm such that sub-pixel resolution is achieved to assess line pattern locations in at least one of the images.

In some embodiments, the system described herein may include a calibration method. The calibration method may create a lookup table by measuring a set of calibration plates with known sizes and thicknesses. The lookup table may be used to convert measurement results in terms of processed line pattern positions in images to surface height values without complicated mathematical calculations. Compared to other calibration methods, which require fine adjustments of camera image sensors, lenses, and distances between the imaging devices and the projector, the herein described calibration method builds lookup tables and eliminates potential lens distortions and mechanical errors by only a few measurements on targets of known dimension. The calibration method minimizes the requirement for high cost components and precise mechanical manufacturing.

In a typical laser triangulation 3D measurement system, a distance and an angle between the light source and the photo detector are crucial. A reasonably large distance and angle are needed to achieve high height resolution. However, if used on a rough surface or a surface with dramatic elevation changes like a pavement aggregate surface, large distances and angles between the light source and the photo detector may result in blind spots. In some areas, a light pattern may be blocked by a surface feature from the view of the imaging device.

Figure 4:
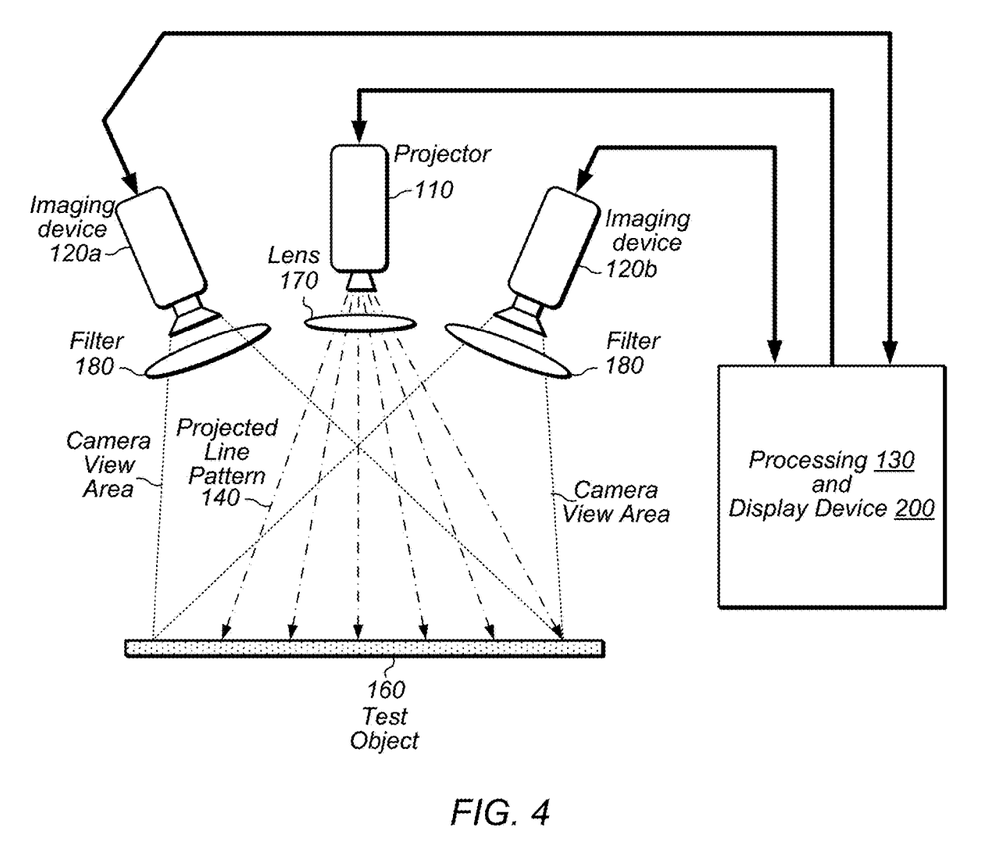
FIG. 4 depicts a diagram of an end view of an embodiment of a system with one pattern projector and two imaging devices.

FIG. 4 depicts a diagram of an end view of an embodiment of a system with one pattern projector and two imaging devices. Imaging device 120a and imaging device 120b may record images of the line light pattern from opposing angles. If a feature on the surface blocks the view of one imaging device from a part of light lines, the second imaging device may have an unobstructed view from a second angle of observation. As a result, if data from one imaging device leave unfilled spots in the data buffer, data from another imaging device may fill part or all of those spots.

Figure 5:
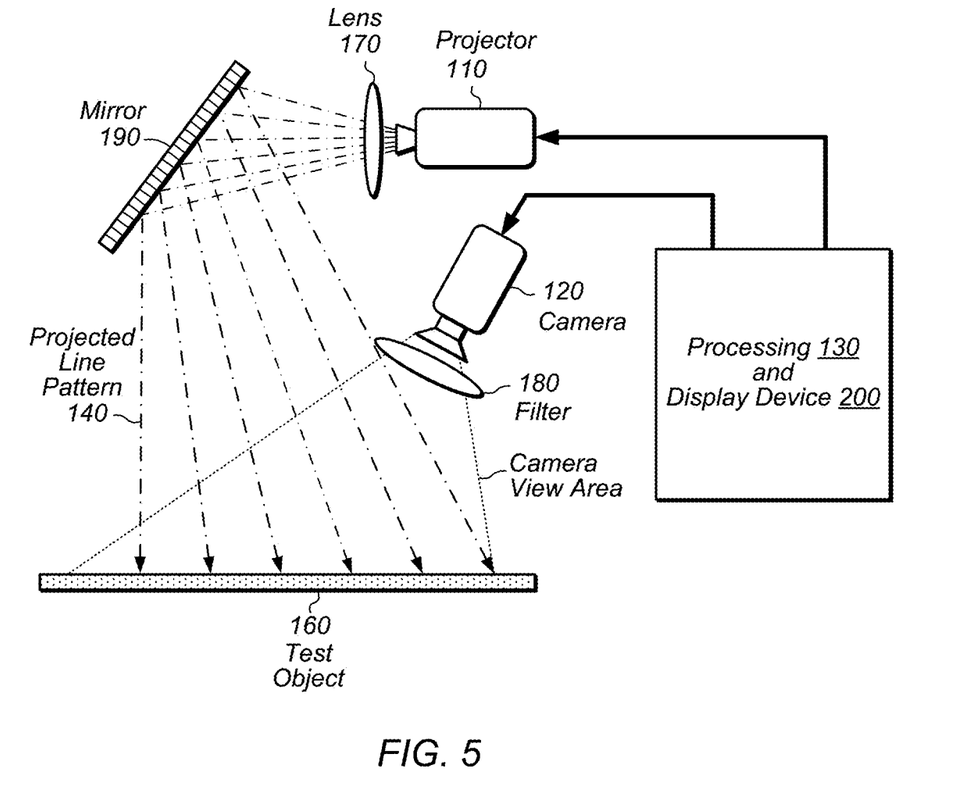
FIG. 5 depicts a diagram of a top view of an embodiment of a compact system using an optical mirror.

For the portable application, a system with a relatively compact size may be preferable. FIG. 5 depicts a diagram of a top view of an embodiment of compact system 100 including optical mirror 190. The mirror may be used to change the light direction from the pattern projector and extend the length of the optical path of the pattern projector. The same projector with a fixed projection angle now can be mounted closer to the test surface while creating the line light pattern on the surface with a relatively similar size as to the pattern depicted in FIGS. 1-2.

Figure 6:
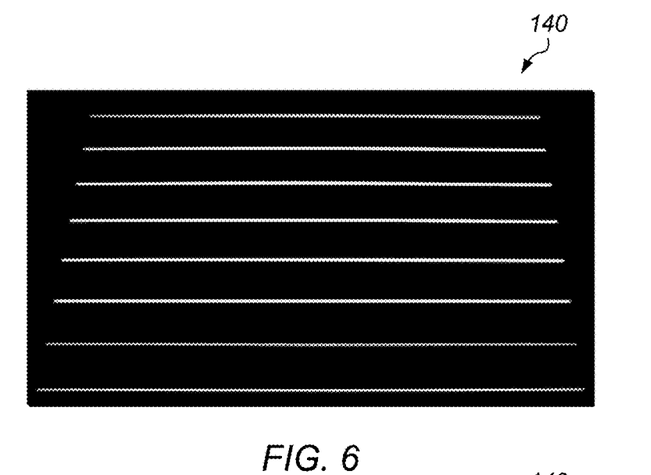
FIG. 6 depicts a diagram of an embodiment of a light line image from a clean, flat surface.
Figure 7:
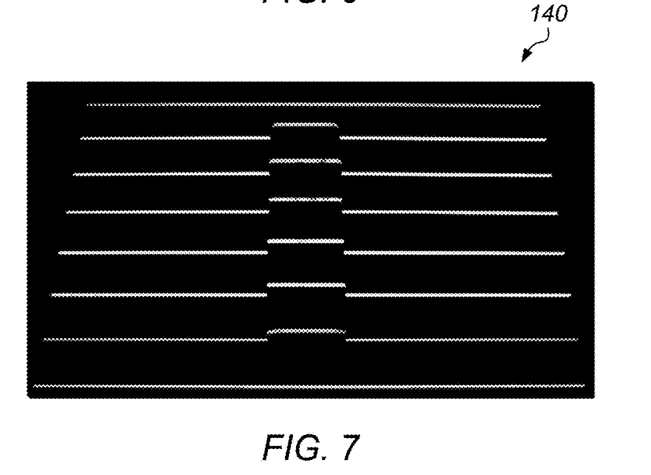
FIG. 7 depicts a diagram of an embodiment of a light line recorded image from a surface with a rectangle object in the middle.

In some embodiments, wherein the pattern of light comprises a straight line or a plurality of straight lines in parallel or in mixed orientations or courses. FIG. 6 depicts a diagram of an embodiment of a light line image from a clean, flat surface. There are seven projected light lines in the image. During the test, these lines will be electronically moved to cover area between each line. Without significant elevation changes on the surface, the recorded image of each light line is a smooth straight line. Because the imaging device's optical axis is not perpendicular to the surface, projected light lines on the surface are distorted. The image resolutions for lines close to the imaging device are higher than those for other lines. Angles between the imaging device's optical axis and pattern projection path of each line are different. This gives different resolutions on elevation measurements at different locations on the surface. The overall specification of the system may be determined by the lowest resolution and the dynamic of measurement on the entire surface. These values may be found in the calibration lookup table. FIG. 7 depicts a diagram of an embodiment of a light line recorded image from a surface with a rectangle object in the middle. Because there is an angle between the imaging device and the pattern projector's optical axis, any elevation change on the surface will cause displacements of the light lines in the imaging device's images. These displacements may be mathematically converted to the real elevation measurement or the height of the object. The object depicted in FIG. 7 is a regular rubber block measured at 2.75 inch long, 0.8 inch wide, and 0.25 in high. Light line images at different locations show different displacements due to variations of resolutions. The bottom line shows a lowest displacement and height resolution.

Figure 8:
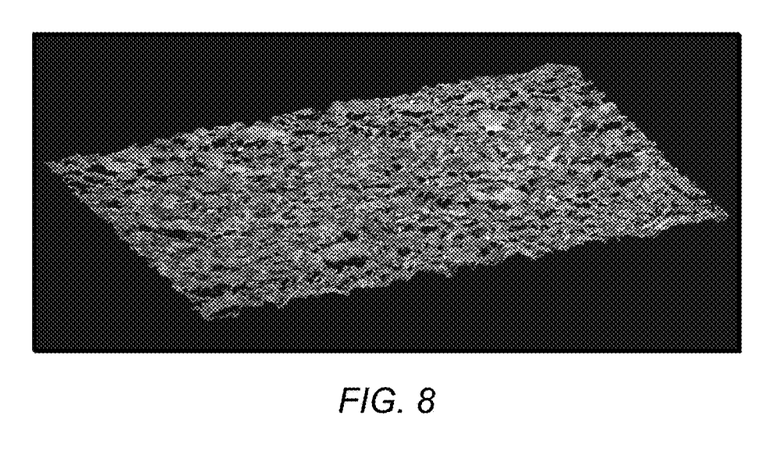
FIG. 8 depicts a diagram of an embodiment of measured data in 3D image view from a 6 by 4 inch asphalt pavement surface.

FIG. 8 depicts a diagram of an embodiment of measured data in 3D image view from a 6 by 4 inch asphalt pavement surface. The image contains 600 lines and 800 data points in each line. Pavement texture mean profile depth can be calculated from each line. The data is an 800 by 600 points array and covers an area of 6 by 4 inch on pavement surface. Each row in this array is an 800 points or a 6 inch (152.4 mm) long surface profile. ASTM standard E1845 of Standard Practice for Calculating Pavement Macrotexture Mean Profile Depth requires a 100 mm surface profile to be used for the mean profile depth (MPD) calculation. A segment of 100 mm long surface profile in each row of data may be calculated for a MPD value, using equations defined in the ASTM standard E1845. An average MPD may be obtained by an average of total 600 MPD values from every row. Compared to other pavement texture measurement methods, which measure only a single track on the surface, the system described herein measures the entire area of the test surface. The result is an accurate and stable 3D image on a non-homogeneous pavement surface.

Figure 9A:
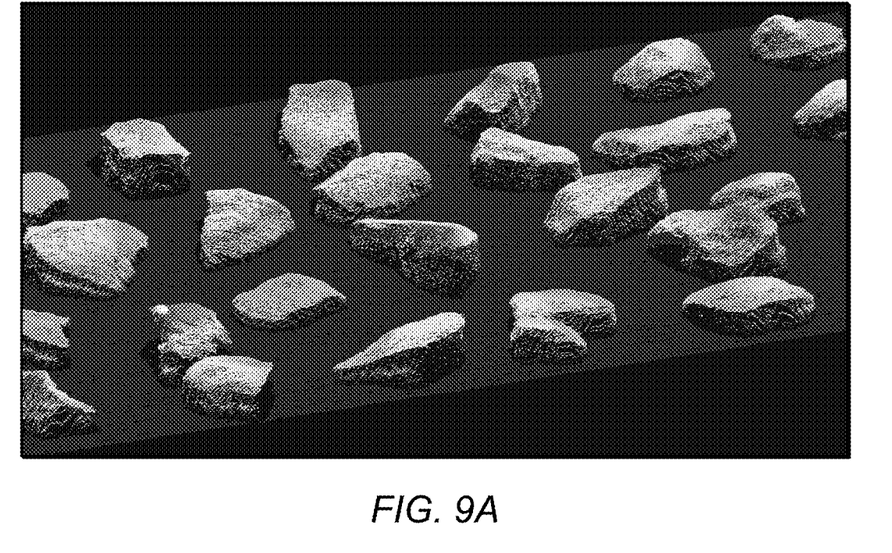
FIG. 9a depicts a diagram of an embodiment of a 3D image view of measured aggregates.
Figure 9B:
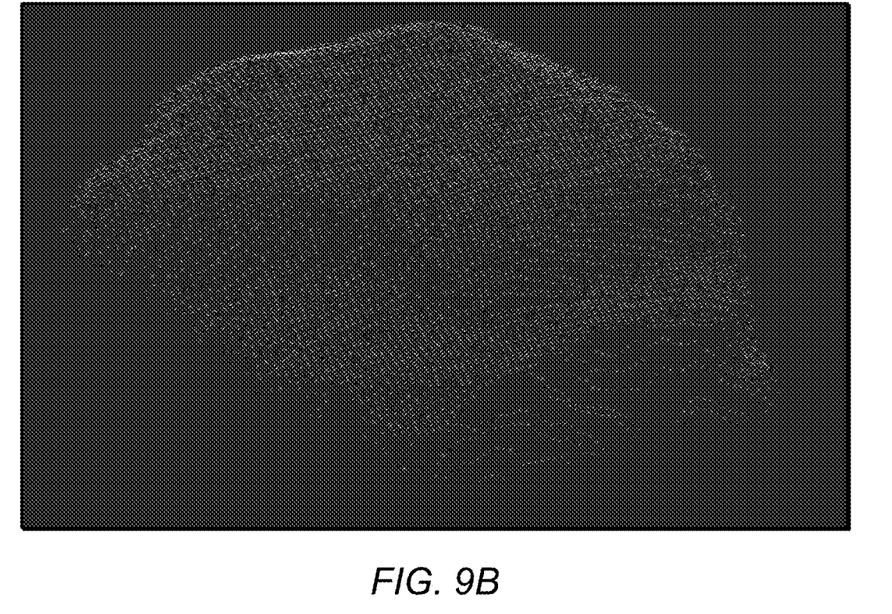

FIG. 9 depicts a diagram of an embodiment of a 3D image view of measured aggregates. FIG. 9a depicts a 3D view of measured crushed aggregates in a size range from 0.5 to 0.75 inches. FIG. 9b depicts a expanded 3D view on a single particle in the aggregate sample. Each dotted line in FIG. 9b may include a surface profile of that particle at a particular cross section. Each dotted line in this view is a profile from the upper surface of the aggregate particle. A set data of aggregate surface texture and angularity may be calculated from each profile. Compared to a surface contour obtained by a two dimensional aggregate imaging system, the profile from the system described herein is actually from a defined location on the surface of an aggregate particle. Multiple profiles may be scanned to cover the entire upper surface of all aggregates. The system described herein provides more comprehensive and accurate results than that of a two dimensional aggregate imaging system, because the two dimensional aggregate imaging system takes the vertical projection (shadow) as the only contour and makes only one calculation on the contour.

Figure 10A:
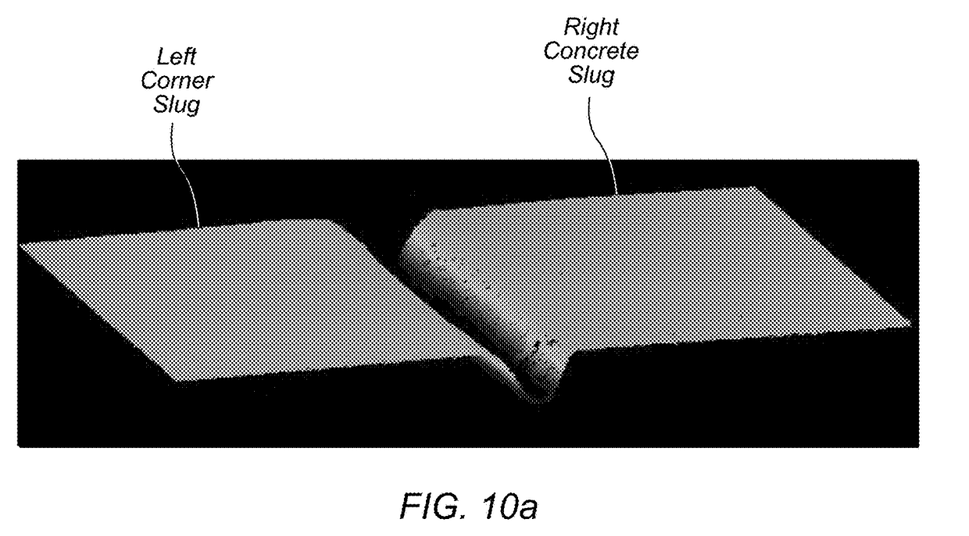
FIG. 10a depicts a diagram of an embodiment of a 3D image view of a concrete joint.
Figure 10B:
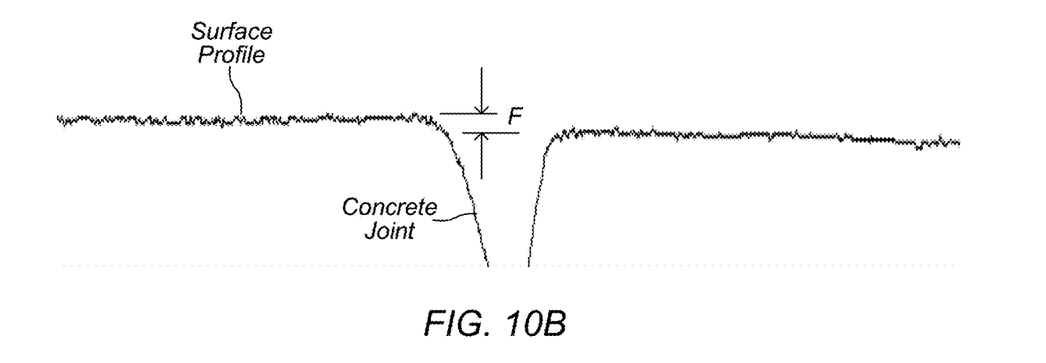

Concrete faulting may be defined as a vertical displacement between two concrete slugs on a jointed concrete pavement or a concrete bridge. FIG. 10a illustrates a concrete joint. In the figure, the surface of left side concrete slug is higher than the surface of right side concrete slug. This displacement is an example of concrete faulting. FIG. 10b depicts a diagram of an embodiment of a measured surface profile of the concrete joint in FIG. 10a. The gap marked as F is a measured faulting value. The entire measurement data contains 600 profiles. Averaging faulting values from all profiles gives an accurate and stable result.

Figure 11A:
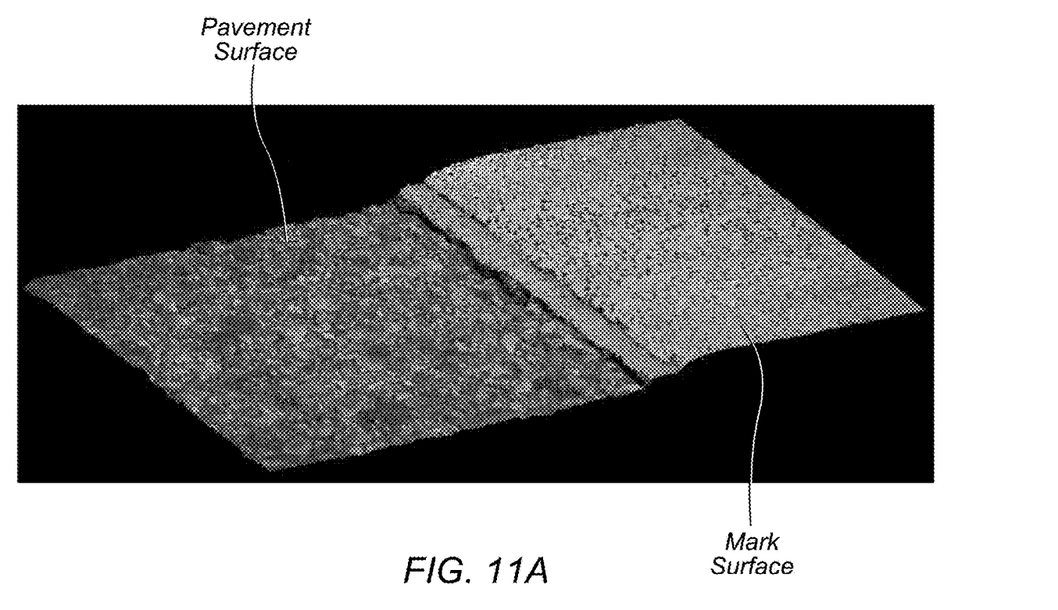
FIG. 11a depicts a diagram of an embodiment of a 3D image view of a measured pavement surface containing an edge of pavement marking.
Figure 11B:
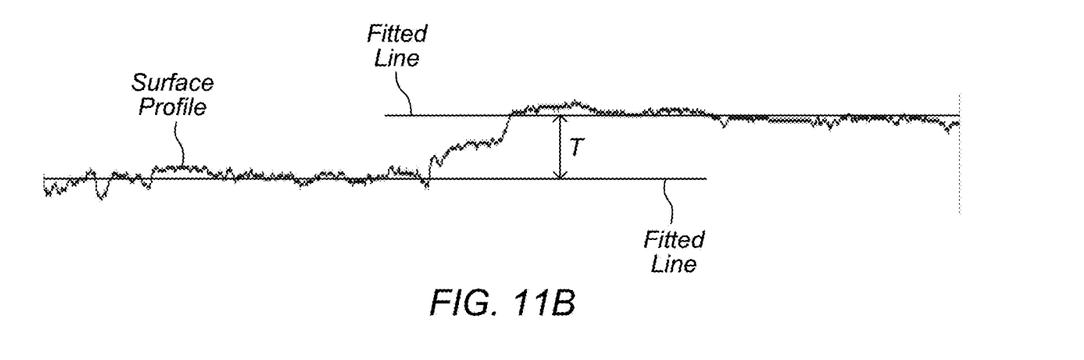

Pavement marking thickness may be measured by an elevation difference between an unmarked pavement surface and a marked surface. FIG. 11a depicts a diagram of an embodiment of a 3D image view of a measured pavement surface containing an edge of pavement marking. FIG. 11b depicts a diagram of an embodiment of a profile of the measured data in FIG. 11a. The left part of the profile is fitted to a straight line on the pavement surface and the right part of the profile is fitted to a straight line on the top of the marking. The difference T between these two lines is the pavement marking thickness. A total of 600 profiles are processed to give an average thickness value.

In some embodiments, the system and methods described herein may be used to measure pavement surface features. For example, pavement surface features may include pavement texture, pavement aggregator surface features, concrete pavement faulting, and/or pavement marking thickness. All these features are surface height change related. Their values are calculated from surface 3D data from the system described herein.

The pavement texture generally refers to the surface's roughness. The pavement texture is measured by the average or mean depth of the surface profile. Pavement texture value is related to the pavement and tire skid resistance. The pavement texture is an important indicator in assessing traffic safety. A proper pavement texture must be maintained to prevent skid related traffic accidents especially under wet weather condition. Pavement texture is related to driving noise. A good pavement must have a proper texture depth to provide enough skid resistance while at the same time avoiding excess traffic noise.

Traditionally, pavement texture is measured with the Sand Patch method as defined in the American Society for Testing and Materials (ASTM) standard E965, or using the Circular Track Meter as defined in ASTM standard E2157. In the Sand Patch test, 50 ml of special selected sand is poured on to the test surface and spread with a small rubber disc tool into a circular patch with the surface depressions filled to the level of the peaks. The diameter of the sand patch then is measured and converted to a value equivalent to the mean profile depth through a standard mathematic equation. The Circular Track Meter method uses a displacement sensor that is mounted on an arm that rotates clockwise at a fixed elevation from the surface being measured. The sensor is attached to the arm at a radius of 142 mm. A circular surface profile is obtained from each test. This profile is then divided into eight segments for the mean profile depth calculation. Data from all segments are averaged to a single mean profile depth measurement. Sand Patch method is subject to the human errors of each operation. It is not accurate on smooth or very rough surface. The Circular Track Meter only samples a trace on the test surface during each measurement. Considering the non-homogeneousness of a typical pavement surface, the Circular Track Meter does not provide a comprehensive representation of surface texture. Recently, a device called laser texture scanner had been used. The device uses a single point laser distance sensor which is mechanically moved by a motor stage to scan an area of 4 inch by 4 inch. This device requires a number of hours to complete a single test.

Pavement aggregate refers to materials such as crushed stones, gravel, sand, slag, seashells, and mineral dust used in pavements. The composition of aggregates paved on road surfaces affects the durability and skid resistance of the pavement. Aggregate surface features are evaluated by its surface texture and angularity. The angularity is related to the sharpness of the corners of two-dimensional profile of aggregate particles. It is used to determine the percentage of flat particles, elongated particles, or flat and elongated particles in coarse aggregate. The texture and angularity are important to ensure adequate aggregate interlock and pavement skid resistance. Digital imaging technology is used to take aggregate image and evaluate the surface features. A device called an aggregate imaging system (AIMS) is currently available. An AIMS system consists of a digital camera, a conveyor to transport aggregates to the imaging area, a light source under the aggregate samples, and an image processing unit. In the camera's view, light is shadowed by aggregates. Each aggregate appears dark in the camera image. The image processing unit measures contours of aggregates and evaluates the size and how sharp or smooth each contour is. The AIMS system only measures one contour from each aggregate. The contour is a shadow of the vertical project, not a real cross section of an aggregate. As all aggregates are in irregular shape, the projected contour is not accurate to the real aggregate size and shape. Placing or turning an aggregate in different positions produces different results.

Concrete faulting is a measurement of a vertical displacement between two concrete slugs on jointed concrete pavement or a bridge joint. It is an indicator of pavement or bridge foundation conditions. Currently, there is no accepted automated method or instrument to accurately measure the concrete faulting. A simple level and a ruler are used in field manual measurements Pavement marking thickness is a measurement of material thickness of different pavement markings. It is an indicator of the quality of the painting process. Markings must have a required thickness to stand up to the traffic wear and tear and provides a minimum visibility during designed service periods. High agencies often cut out a core sample from markings to measure its thickness, or put an object on the location before the painting and check the thickness of accumulated material on the object. There is a need in the industry for an automated method or instrument to accurately measure the marking thickness.

Pavement texture, aggregate surface features, concrete faulting, and pavement marking thickness are all surface structure related measurements. Using a 3D surface feature measurement system and corresponding processing method as described herein may produce accurate and comprehensive result for these parameters.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system for measuring surface features, comprising:
a pattern projector which, during use, projects a pattern of light on a surface of an object, wherein the pattern projector comprises a mini LED video projector;
at least one digital imaging device which, during use, records at least one image of the projected pattern of light, wherein the at least one imaging device comprises a high definition webcam; and
an image processing device which, during use, converts projected patterns of light recorded on at least one of the images to three-dimensional data points representing a surface geometry of the object using relative positions and relative angles between the at least one imaging device and the pattern projector, wherein the image processing device measures concrete faulting or pavement marking thickness.

2. The system of claim 1, further comprising a display device which displays, during use, the three-dimensional data points.

3. The system of claim 1, further comprising a display device which displays, during use, the three-dimensional data points graphically and/or numerically.

4. The system of claim 1, wherein the image processing device uses a center of gravity algorithm such that sub-pixel resolution is achieved to assess line pattern locations in at least one of the images.

5. The system of claim 1, wherein at least one of the digital imaging devices comprises one or more digital cameras.

6. The system of claim 1, wherein at least one of the digital imaging devices comprises one or more additional optical lens for focus adjustment.

7. The system of claim 1, wherein at least one of the digital imaging devices comprises one or more filters for polarizing the light.

8. The system of claim 1, wherein the pattern projector moves, during use, the pattern of light along the surface of the object, in response to electronic control signals.

9. The system of claim 1, wherein the pattern projector projects the pattern of light using at least one of a laser light source or an LED light source.

10. The system of claim 1, wherein the pattern of light comprises a straight line or a plurality of straight lines in parallel or in mixed orientations or courses.

11. The system of claim 1, wherein the image processing device assesses, during use, pavement aggregate physical properties.

12. The system of claim 1, wherein the image processing device assesses, during use, pavement aggregate physical properties, wherein the aggregate physical properties comprise at least one of a shape, a surface texture, or a size.

13. The system of claim 1, wherein the image processing device assesses, during use, pavement aggregate physical properties, wherein the aggregate physical properties comprise at least one of a shape, a surface texture, or a size, and wherein the shape comprises at least one of a form, an angularity, or aggregate distribution.

14. The system of claim 1, wherein the image processing device calibrates, during use, the system by performing the following activities:
measuring the pattern of light projected on a set of plates comprising known dimensions;
generating an array of data which represents positions of the pattern of light in the at least one recorded image corresponding to a given surface height for the set of plates, wherein the set of plates comprises at least one physical dimension which is different among the set of plates; and
interpolating additional arrays to produce a calibration table.

15. A system for measuring surface features, comprising:
a pattern projector which, during use, projects a pattern of light on a surface of an object, wherein the pattern projector comprises a mini LED video projector;
at least one digital imaging device which, during use, records at least one image of the projected pattern of light, wherein the at least one imaging device comprises a high definition webcam; and
an image processing device which, during use, converts projected patterns of light recorded on at least one of the images to three-dimensional data points representing a surface geometry of the object using relative positions and relative angles between the at least one imaging device and the pattern projector, wherein the image processing device measures concrete faulting or pavement marking thickness, wherein the image processing device calibrates, during use, the system by performing the following activities:
measuring the pattern of light projected on a set of plates comprising known dimensions;
generating an array of data which represents positions of the pattern of light in the at least one recorded image corresponding to a given surface height for the set of plates, wherein the set of plates comprise at least one physical dimension which is different among the set of plates;
interpolating additional arrays to produce a calibration table; and
using the calibration table in order to reduce measurement errors acquired by the system.

16. The system of claim 15, wherein the image processing device uses a center of gravity algorithm such that sub-pixel resolution is achieved to assess line pattern locations in at least one of the images.

17. The system of claim 15, wherein the pattern projector moves, during use, the pattern of light along the surface of the object, wherein the pattern projector moves the pattern of light in response to electronic control signals.

18. The system of claim 15, wherein at least one of the digital imaging devices comprises one or more digital cameras.

19. The system of claim 15, wherein at least one of the digital imaging devices comprises one or more additional optical lens for focus adjustment.

20. The system of claim 15, wherein at least one of the digital imaging devices comprises one or more filters for polarizing the light.

* * * * *